(No Model.) 2 Sheets—Sheet 2.
H. HARTMAN.
Bridle.
No. 229,405. Patented June 29, 1880.
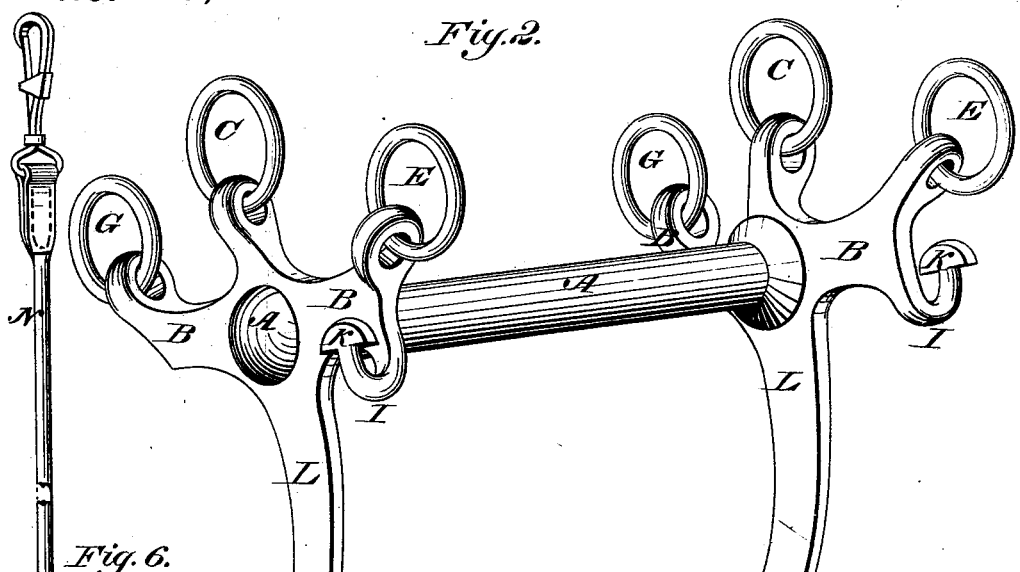
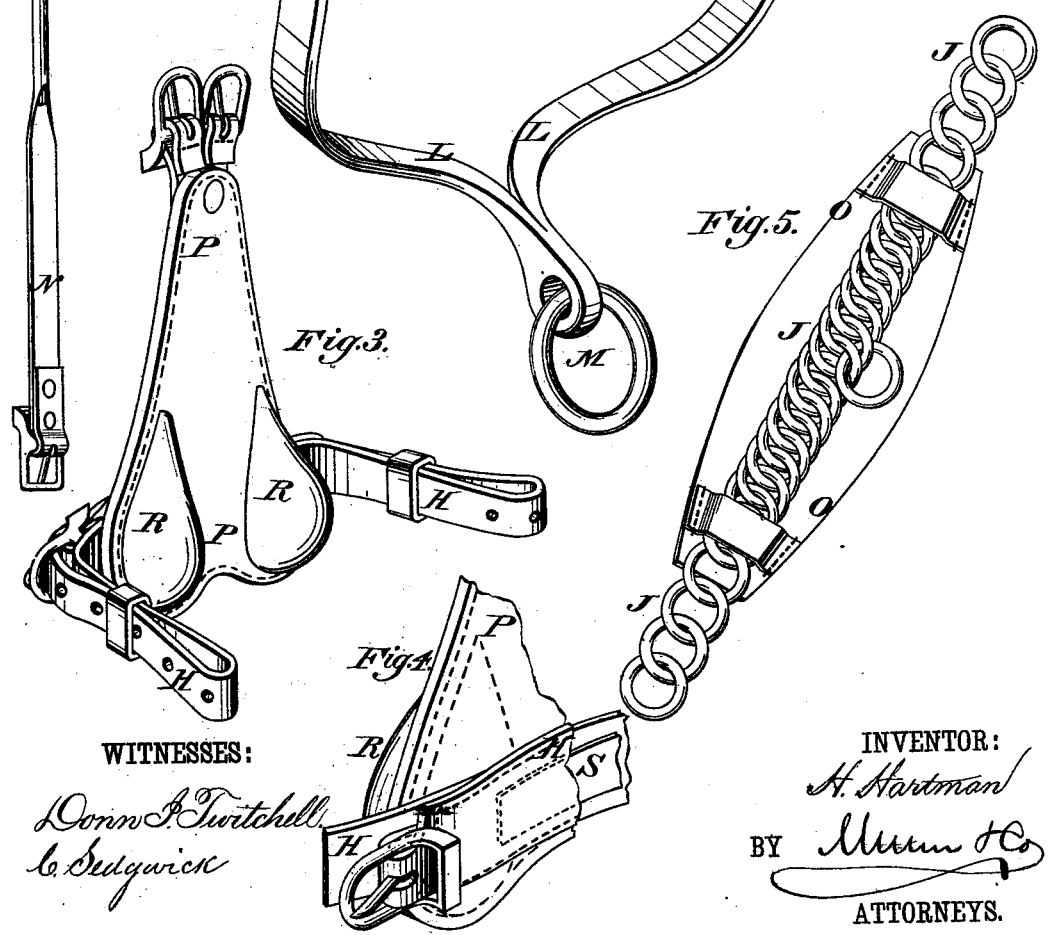
WITNESSES:
Donn J. Twitchell
C. Sedgwick
INVENTOR:
H. Hartman
BY Munn & Co.
ATTORNEYS.
N. PETERS, PHOTO-LITHOGRAPHER, WASHINGTON, D. C.

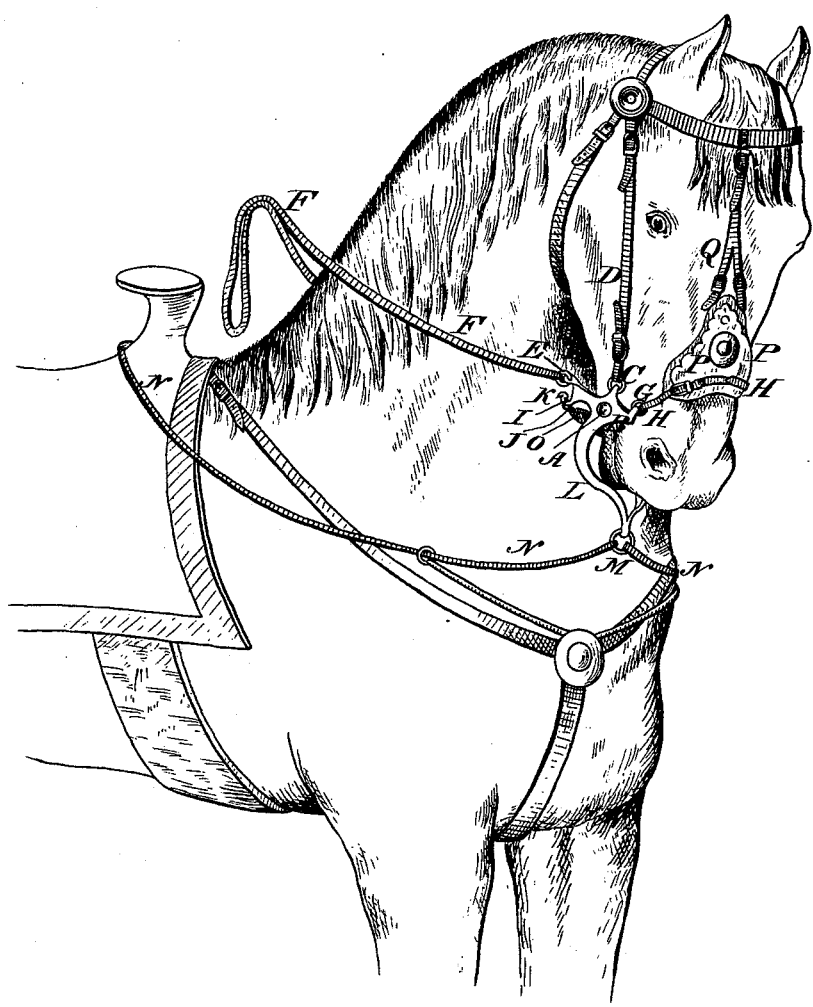

UNITED STATES PATENT OFFICE.

HENRY HARTMAN, OF SALT LAKE CITY, UTAH TERRITORY, ASSIGNOR OF ONE-HALF OF HIS RIGHT TO ANGUS McKELLAR, OF SAME PLACE.

BRIDLE.

SPECIFICATION forming part of Letters Patent No. 229,405, dated June 29, 1880.

Application filed April 12, 1880. (No model.)

*To all whom it may concern:*

Be it known that I, HENRY HARTMAN, of Salt Lake City, in the county of Salt Lake, Territory of Utah, have invented a new and useful Improvement in Riding and Driving Bridles, of which the following is a specification.

Figure 1, Sheet 1, is a perspective view of the improvement, illustrating its use. Fig. 2, Sheet 2, is a perspective view of the bit. Fig. 3, Sheet 2, is a perspective view of the nose-pad. Fig. 4, Sheet 2, is a perspective view of a part of the nose-pad. Fig. 5, Sheet 2, is a perspective view of the curb-chain and pad. Fig. 6, Sheet 2, is a perspective view of the safety-line.

Similar letters of reference indicate corresponding parts.

The object of this invention is to furnish riding and driving bridles so constructed that horses can be easily and quickly controlled should they become frightened or attempt to practice ugly or dangerous tricks.

A is the mouth-piece of the bit, the ends of which are swiveled to the bars B. Upon the bars B, above the ends of the mouth-piece A, are formed lugs, in which are secured rings C, to receive the cheek-straps D of the bridle.

To the rear ends of the bars B are secured rings E, to receive the riding or driving reins F, by which the horse is guided and controlled under ordinary circumstances.

To the forward ends of the bars B are secured rings G, to receive the nose-strap H. Upon the lower sides of the rear ends of the bars B are formed hooks I, to receive the curb-chain J. The hooks I are curved outward and upward, and have cross-heads or T-buttons K upon their ends, to prevent the curb-chain J from becoming detached accidentally.

Upon the lower sides of the bars B, below the ends of the bit A, are formed arms L, which project downward, are curved inward and rearward, and have their ends connected or formed solid with each other.

To the ends of the arms L is attached a ring, M, to receive the end of the safety-line N, which may be double or single, as may be desired. For riding-horses I prefer to use the safety-line N double, or like ordinary riding-reins, as shown in Fig. 1; but for driving-horses a single rein to each horse will be sufficient.

The forward part of the safety-rein N is made round, as shown in Fig. 6, and its rear part is made flat, and is provided with a buckle to buckle upon the strap that extends back to the driver, and which I prefer to make of webbing, so that it will be readily distinguishable to the touch.

To the curb-chain J is attached, by keepers or other suitable means, a pad or leather plate, O, to prevent the said curb-chain J from chafing the horse.

P is a triangular or heart-shaped leather plate, the lower part of which is sewed to the nose-strap H. The upper end of the plate P is buckled or otherwise secured to the face-strap Q.

To the inner surface of the side parts of the lower end of the plate P are attached half-pear-shaped knobs or blocks R, of wood or other suitable material, in such positions as to be over the air-passages of the horse's nose, a little above the nostrils, as shown in Fig. 1. The knobs R are covered with soft leather or other suitable material to prevent them from hurting or rubbing the horse.

To the lower part of the plate P, between the plies of the nose-strap H, or between the nose-strap H and the plate P, is secured a steel spring, S, the end parts of which are slightly curved outward, so as to hold the knobs R raised except when the safety-line N is drawn upon. With this construction, when the safety-line N is drawn upon the pad P R will be drawn down, closing the air-passages of the horse's nose, and preventing him from breathing, so that he will be reduced at once to subjection.

I am aware that it is not new to make a bit with downwardly-projecting arms on which are slide-rings connected with the bit; or to use boxes on each side of the nose-band opposite the nostrils, containing levers and hinged pads; or to attach pads to a spring-band secured to the bridle by straps and to which the safety-reins are attached; or to attach pads to a spring-bar which passes across the horse's nose and through slides on the bridle to the safety-rein; but

What I claim as new is—

1. In riding and driving bridles, the bit, constructed substantially as herein shown and described, consisting of the mouth-piece A, the bars B, having rings C E G, the lever-arms L, having ring M, and the hooks I, having cross-heads or buttons K, to adapt the bit to receive the various appliances of the bridle, as set forth.

2. In riding and driving bridles, the hooks I, formed upon the bit-bars B and having cross-head buttons K upon their ends, substantially as herein shown and described, whereby the curb-chain J is prevented from becoming accidentally detached, as set forth.

HENRY HARTMAN.

Witnesses:
NATHAN KEMPTON,
CHAS. F. BLANDIN.